United States Patent
Gordon et al.

(10) Patent No.: US 7,312,910 B1
(45) Date of Patent: Dec. 25, 2007

(54) DISPERSION-MANAGED SOLITON TRANSMISSION SYSTEM WITH GUIDING FILTERS

(75) Inventors: James Power Gordon, Rumson, NJ (US); Pavel Viktorovich Mamyshev, Morganville, NJ (US); Linn Frederick Mollenauer, Colts Neck, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/378,808

(22) Filed: Aug. 23, 1999

Related U.S. Application Data (60) Provisional application No. 60/101,765, filed on Sep. 25, 1998, and provisional application No. 60/101,773, filed on Sep. 25, 1998.

(51) Int. Cl.
*H04B 10/12* (2006.01)

(52) U.S. Cl. .................. 359/179; 359/161; 359/188
(58) Field of Classification Search ................. 359/179, 359/188, 161
See application file for complete search history.

(56) References Cited

U.S. PATENT DOCUMENTS

| | | | | |
|---|---|---|---|---|
| 5,557,441 | A | * 9/1996 | Mollenauer ................. | 359/179 |
| 5,764,841 | A | * 6/1998 | Iwatsuki et al ............. | 359/109 |
| 5,986,789 | A | * 11/1999 | Kawai et al. ................ | 359/179 |
| 6,141,129 | A | * 10/2000 | Mamyshev ................. | 359/179 |

OTHER PUBLICATIONS

D.S. Govan, et al., "Long Distance 40-Gbit/s Soliton Transmission Over Standard Fiber By Use of Dispersion Management," in Optics Letters vol. 23, No. 19 pp 1523–1525 (1998).

A.M. Niculae et al., "Soliton Collisions with Wavelength-Division Multiplexed Systems with Strong Dispersion Management," in Optics Letters vol. 23, No. 17 pp. 1354–1356 (1998).

(Continued)

*Primary Examiner*—Daniel J. Wu
(74) *Attorney, Agent, or Firm*—Gregory A. Welte

(57) ABSTRACT

A new dispersion managed soliton transmission system where the D map period is the same as the amplifier period and the pulse breathing the in the +D sections of the D maps is approximately symmetrical. Pulse breathing symmetry by one or both of two techniques. In one technique a guiding filter is placed at the beginning of the D map period such that the guiding filter reduces the bandwidth of soliton pulses passing through it by a minimum amount. Consequently, pulse breathing symmetry is restored. The path average pulse energy vs. $\bar{D}$ behavior of solitons propagating through the D map is changed such that (1) solitons of modest bandwidths have adequate energy at or near $\bar{D}$=to provide for error-free transmission over transoceanic distances at or near $\bar{D}$=0, and (2) such that the path average pulse energy is nearly independent of $\bar{D}$, at or near $\bar{D}$=0 for solitons of various pulse widths. The transmission system having this D map is much more tolerant of variations in $\bar{D}$ and pulse width than the prior art. Another technique uses two different types of +D fiber in the +D section so that there is a step change in the ratio of D divided by the cross-sectional area of the fiber, or "$A_{eff}$", as solitons propagate from one type of +D fiber to the other type of +D fiber in the +D section. This step change in $$\frac{D}{A_{eff}}$$

nullifies the effects of the variation in pulse intensity thereby restoring the pulse breathing symmetry. Furthermore, through the use of intermediate Raman amplification, signal loss in transmission lines having very large amplifier periods, e.g., 80 km or 120 km, is overcome.

8 Claims, 6 Drawing Sheets

OTHER PUBLICATIONS

Finlay M. Knox, et al., "10–Gbt/s Soliton Communication Systems Over Standard Fiber at 1.55um and Use of Dispersion Compensation" in Journal of Lightwave Technology, vol. 13, No. 10 pp. 1955–1961 (1995).

E. Yamada, et al.,"10Gbits/s, 10600 km Dispersion–Allocated Soliton Transmission Using Conventional 1.3um Singlemode Fibers" in Electronics Letters, vol. 33, No. 7, pp. 602–603 (1997).

D.M. Rothnie and J.E. Midwinter, "Improved Standard Fibre Performance by Positioning the Dispersion Compensating Fibre," in Electronic Letters vol. 32, No. 20 pp. 1907–1908 (1996).

A. Bernston, et. al., "Power Dependance of Dispersion–Managed Solitons for Anomalous Zero and Normal Path–Average Dispersion," in Optics Letters, vol. 23, No. 12 (1998).

* cited by examiner

DISPERSION-MANAGED SOLITON TRANSMISSION SYSTEM WITH GUIDING FILTERS

This application claims the benefit of U.S. Provisional Application No. 60/101,765, filed Sep. 25, 1998, and U.S. Provisional Application No. 60/101,773, also filed Sep. 25, 1998.

FIELD OF THE INVENTION

The present invention relates generally to the field of fiber optic communications and specifically to systems for transmitting dispersion-managed solitons using guiding filters.

BACKGROUND OF THE INVENTION

Figure 1:
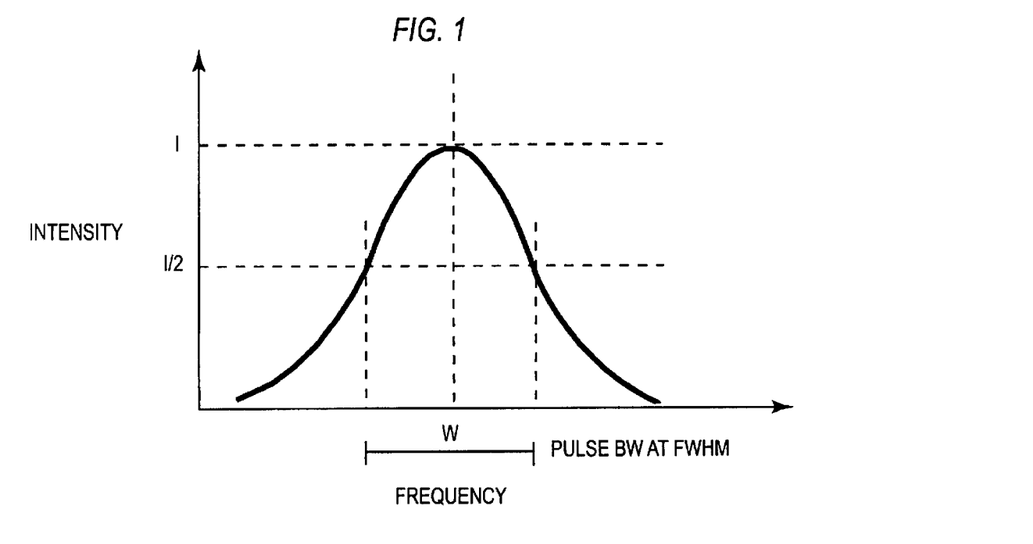
FIG. 1 shows a light pulse as an energy distribution over a range of frequencies.

Data transmission using optical fibers involves the propagation of pulses of light through the fibers. A light pulse generated at a specific frequency ω actually consists of a spectrum, i.e., a distribution of energy over a band of frequencies, with the peak of the spectrum occurring at frequency ω. The frequency at which the peak of a pulse occurs is known as the central frequency of the pulse. FIG. 1 shows a light pulse generated at frequency ω with a peak intensity I. The bandwidth of the pulse is defined as the range of frequencies wherein the frequency components of the pulse have a specified fraction of intensity of the pulse peak. Typically, the pulse bandwidth is defined as the full width at half maximum intensity, or "FWHM", which means the range of frequencies wherein the frequency components of the pulse have half the intensity of the pulse peak.

Another characteristic of a pulse is its width. Pulse width refers to the time duration of a pulse. Pulse width and pulse bandwidth are inversely related such that increasing a pulse's width decreases its bandwidth and vice versa.

In a binary digital communication system, two discrete states are used for communication, i.e., ones and zeros. In a binary system, a single discrete state represents a unit of information known as a bit. Thus a binary data stream consists of a stream of time slots, or "bit periods", where each bit period contains either a one or a zero. In an optical system, the presence or absence of a pulse within a bit period signifies a discrete state. For example, the presence of a pulse could signify a one for that period whereas the absence of a pulse would signify a zero. Thus, a stream of pulses, known as a pulse train, is used in an optical system to represent a binary data stream.

As light pulses travel through a fiber optic transmission line, they may be distorted in a variety of ways which affect their ability to represent binary digital data. Thus various techniques and transmission line designs exist which attempt to combat various types of distortion.

One type of distortion affecting light pulses is dispersion. Dispersion causes a differential phase shift in the frequency components of a pulse which causes these frequency components to become "chirped", i.e., out of phase relative to each other. As the frequency components of the pulse become chirped, the pulse spreads out in time. Thus dispersion causes the width of a pulse to broaden as the pulse propagates down the fiber. It should be noted here that a pulse of a given bandwidth has its narrowest pulse width when the frequency components of the pulse are in phase. In this condition, the pulse is said to be "unchirped".

If the pulse widths become too large, adjacent pulses begin to overlap in time and to interact with each other. This interaction is another type of distortion, in which the pulses tend to be moved from their proper positions in time and so cause error. If pulse widths become still larger, pulses in successive bit periods will overlap, making it difficult to distinguish and detect the data represented by those pulses.

The amount of dispersion affecting pulses is dependent on the properties of the optical fiber. An optical fiber's dispersion constant, or "D", describes the amount of dispersive effect that fiber has on pulses travelling through it.

One technique for combating the pulse width broadening effect of dispersion is to transmit data using a special type of pulse, known as a soliton, which is resistant to dispersion. The soliton resists dispersion by taking advantage of another type of distortion, known as self-phase modulation, or "SPM", which counters the pulse width broadening of dispersion.

Like dispersion, SPM also causes a differential phase shift across a light pulse. However, the differential phase shift caused by SPM does not broaden the pulse in time. Rather, the SPM differential phase shift causes new frequency components to be added to a pulse as it travels through an optical fiber. The addition of new frequency components to the pulse increases the pulse's bandwidth.

The amount of SPM affecting a pulse is determined by the pulse's intensity. Thus, the stronger the pulse's intensity, the greater the effect of SPM, and the more the pulse's bandwidth will be increased.

In a soliton, dispersion and SPM cancel each other's effects because the differential phase shift across the pulse caused by dispersion and the differential phase shift across the pulse caused by SPM sum to a constant phase shift across the pulse. This constant phase shift across the pulse does not affect either the pulse's width or bandwidth. Thus, a soliton's pulse width and bandwidth remains stable as it propagates through an optical fiber transmission line.

Another type of distortion is known as timing jitter. The pulses in a particular pulse train ideally all have the same central frequency. However, optical amplifiers along the transmission line create spontaneous emission noise which causes small, random alterations in the central frequencies of the pulses. The cumulative dispersion encountered by pulses as they travel down the transmission line converts these alterations in central frequency into differences in pulse arrival times, i.e., the time at which a pulse arrives at a particular location in the transmission line such as the receiver. If the cumulative dispersion encountered by pulses is large, the corresponding large differences in arrival times can result in the pulses being received at the incorrect time slot or bit period. This leads to errors in decoding the information represented by the pulses.

Other types of distortion are encountered in optical systems employing wavelength division multiplexing or "WDM". WDM refers to the use of different frequencies or wavelengths as distinct communication channels within a single optical fiber.

Communication channel, or simply channel, refers to the means through which a data communication stream is sent. Communication systems may employ multiple channels so as to transmit multiple data communication streams simultaneously. In optical communications, different channels may be created using different frequencies or wavelengths. Thus the different channels can be said to be divided, i.e., separated, by frequency or wavelength.

Figure 2:
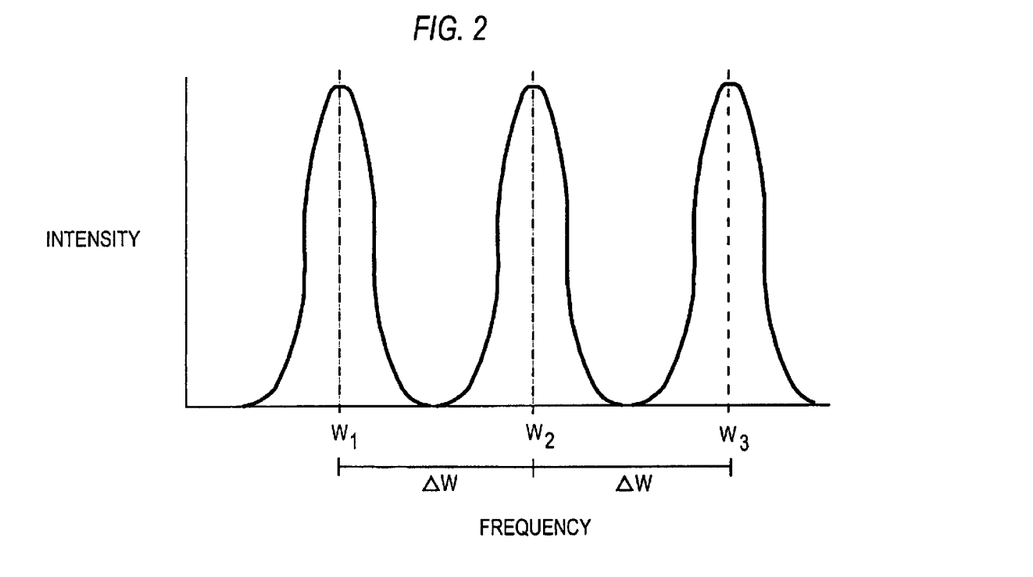
FIG. 2 shows the spectra of several frequency channels in a WDM system.

Furthermore, when multiple channels are placed in a single physical path, they are said to be multiplexed. Thus, WDM refers to the situation where multiple frequency or wavelength channels exist within a single optical fiber. FIG.

2 shows three channels of a WDM system at frequencies $\omega_1$, $\omega_2$, and $\omega_3$. The frequency interval $\Delta\omega$ between frequency channels is known as the channel spacing of the system.

As can be seen from FIG. 2, the spectral density of a WDM system, i.e., the number of frequency channels which can be placed within a given frequency range, is limited by the bandwidth of the pulses if we are to avoid significant overlapping between the spectra of adjacent channels. Consequently, narrower pulse bandwidths allows for more frequency channels to be used in a given frequency range.

In a transmission system employing WDM, two types of distortion, known as four-wave mixing and cross-phase modulation, result from interaction between pulses as pulses of adjacent frequency channels pass through each other. In general, these effects have the potential to bring about a significant exchange of energy and momentum between the pulses which creates timing jitter and amplitude jitter, the latter referring to fluctuations in the intensity of the pulses.

The timing jitter resulting from cumulative dispersion and the effects of four-wave mixing and cross-phase modulation can be reduced through the use of dispersion management. Dispersion management is a technique for designing transmission lines. A dispersion managed transmission line is designed with periodic sections, i.e., identical sections which are repeated one after another along the transmission line. Each section is made up of two or more different types of fiber having alternating positive and negative values of D. The sequence of D values along such a transmission line is known as a D map and each section of the transmission line is represented by a single D map period.

With dispersion management, the different types of fiber and the lengths of those fibers used in each D map period are chosen such that (1) the absolute value of the instantaneous D at any point along the D map period, known as $|D_{loc}|$, is high, i.e., 3 ps/(nm-km) or higher, (2) while at the same time the path average dispersion, or "$\overline{D}$", for the D map period is at or near zero, i.e., 0.5 ps/(nm-km) or lower. Path average dispersion is defined as $$\overline{D} = \frac{1}{L}\int_0^L D(z)\,dz, \quad (1)$$

where D(z) is the instantaneous value of D at any point along the D map period and L is the length of the D map period.

Qualitatively, the concept of dispersion management can be represented by a D map having two segments of fiber, for example one segment of 20 km and having D of +11 ps/(nm-km) and another segment of 20 km and having D of −10 ps/(nm-km). The $|D_{loc}|$ at any point along the D map period is high, i.e., approximately 11 ps/(nm-km) or 10 ps/(nm-km), while $\overline{D}$, which can be approximately calculated as [(+11)(20 km)+(−10)(20 km)] ¹⁄₄₀=0.5 ps/(nm-km), is low. However, this qualitative example assumes that D remains perfectly constant over the entire length of a fiber. In reality, D wanders somewhat from the expected value all along the length of the fiber. Therefore, $\overline{D}$ is most accurately defined by equation (1) above.

In a dispersion managed transmission line, the high $|D_{loc}|$ reduces the effects of four-wave mixing and makes the effects of cross-phase modulation more manageable. Also, since $\overline{D}$ is at or near zero, the cumulative dispersion encountered by pulses is very low and thus timing jitter is kept to a minimum.

Figure 3:
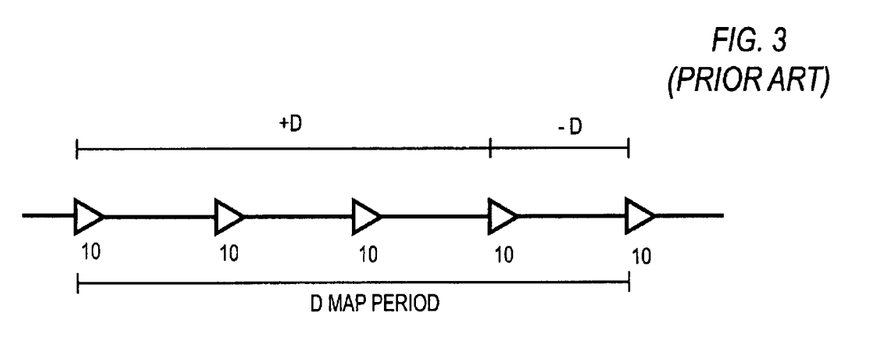
FIG. 3 shows a D map period for a prior art dispersion managed soliton transmission line.

FIG. 3 shows the D map period of a conventional dispersion managed soliton transmission line. This prior art D map period contains two sections of fiber, the first having a positive D, or "+D", and a long length than the second section which has a very large negative D, or "−D", and a short length. Also, the prior art D map period contains several optical amplifiers 10. The distance between optical amplifiers is known as the amplifier period. Thus, the prior art D map period is several amplifier periods long.

Conventional dispersion managed soliton transmission lines having D maps similar to that shown in FIG. 3 are deficient in several ways. In such a transmission line, only pulses of short widths have significant energy at or near $\overline{D}$=0 while pulses of longer widths have zero or minimal energy at or near $\overline{D}$=0. Pulses propagating through an optical fiber transmission line must have a minimum threshold of path average pulse energy if the signal-to-noise ratio is to be high enough to achieve error free transmission over very long, e.g., transoceanic, distances. Thus, in transmission lines having this prior art D map, only solitons with short pulse widths (and large bandwidths) have this adequate level of path average pulse energy at or near $\overline{D}$=0 while solitons with long pulse widths (and narrow bandwidths) do not. In a WDM system, large pulse bandwidths restrict the system to fewer frequency channels for a given frequency range. This results in a low spectral efficiency for a transmission line having this prior art D map. Spectral efficiency, which is defined as the bit-rate/channel separation, is a measure of the communication efficiency of a WDM system.

Furthermore, at or near $\overline{D}$=0, the path average pulse energy of solitons in this transmission line depends critically on both $\overline{D}$ and the pulse width $\tau$. This critical dependence makes this transmission line less practical for use since in real world systems $\overline{D}$ and generated pulse widths can vary.

Also, a prior art transmission line having a D map similar to FIG. 3 is deficient because the D map period is not the same as the amplifier period. Creating transmission lines where the D map period is multiple amplifier periods long is often disadvantageous. For one thing, the long period tends to produce too great pulse breathing, with the result of excessive adjacent pulse interaction. However, if these prior art D maps are altered so that the amplifier period is made to be the same as the D map period, the pulse breathing in the +D section of the D map period becomes highly asymmetric. This in turn also results in excessive pulse interaction.

Pulse breathing refers to the contraction and expansion of a pulse's width as it propagates through an optical fiber. As stated previously, dispersion causes the soliton pulse width to increase and SPM tends to counteract this effect in +D fiber. Since SPM is dependent on the intensity of the pulse, the effects of SPM are strongest at the beginning of the +D section, where the pulse has just been energized by the optical amplifier, and will gradually decrease and be weakest at the end of the +D section since the pulse experiences loss as it propagates through the fiber. Consequently the pulse broadening effect of dispersion is more strongly compensated by SPM at the beginning of the +D section and less compensated at the end of the +D section. This uneven compensation results in asymmetric pulse breathing.

Where pulse breathing is symmetrical the pulse width will vary from maxima which are nearly equal. However, for the same total dispersion in the map, where the pulse breathing is asymmetrical, the pulse width will vary to a maximum width which considerably exceeds the maxima of the symmetrical situation. Thus, the condition of symmetry facilitates keeping the pulse breathing within the limits required for negligible pulse interaction.

SUMMARY OF THE INVENTION

The present invention consists of a new dispersion managed soliton transmission system where the D map period is the same as the amplifier period. Unlike the prior art, the pulse breathing in the +D sections of the D maps of the present invention is approximately symmetrical.

The present invention employs two techniques for restoring the pulse breathing symmetry which may be used individually or together. One technique involves placing a guiding filter at the beginning of the D map period such that the guiding filter reduces the bandwidth of soliton pulses passing through it by a minimum amount. One effect of this step reduction in bandwidth is to restore the pulse breathing symmetry. Another more important effect is to cause a dramatic change in the path average pulse energy vs. $\overline{D}$ behavior of solitons propagating through the D map such that (1) solitons of modest bandwidths have adequate energy at or near $\overline{D}=0$ to provide for error-free transmission over transoceanic distances at or near $\overline{D}=0$, and (2) such that the path average pulse energy is nearly independent of $\overline{D}$, at or near $\overline{D}=0$ for solitons of various pulse widths. The effect of (2) is that the transmission system having this D map is much more tolerant of variations in $\overline{D}$ and pulse width than the prior art.

Another technique involves using two different types of +D fiber in the +D section so that there is a step change in the ratio of D divided by the cross-sectional area of the fiber, or "$A_{eff}$". In other words, there is a step change in $$\frac{D}{A_{eff}}$$

as solitons propagate from one type of +D fiber to the other type of +D fiber in the +D section. This step change in $$\frac{D}{A_{eff}}$$

nullifies the effects of the variation in pulse intensity thereby restoring the pulse breathing symmetry.

The present invention also includes an embodiment where signal loss in transmission lines having very large amplifier periods, e.g., 80 km or 120 km, is overcome through the use of intermediate Raman amplification.

BRIEF DESCRIPTION OF THE DRAWINGS

FIG. 10 shows the signal power versus distance for solitons propagating through the D map period of FIG. 9a.

FIG. 11 shows a graph of the path average pulse energy vs. $\overline{D}$ for solitons propagating through the D map of FIG. 10a.

DETAILED DESCRIPTION OF THE INVENTION

Figure 4:
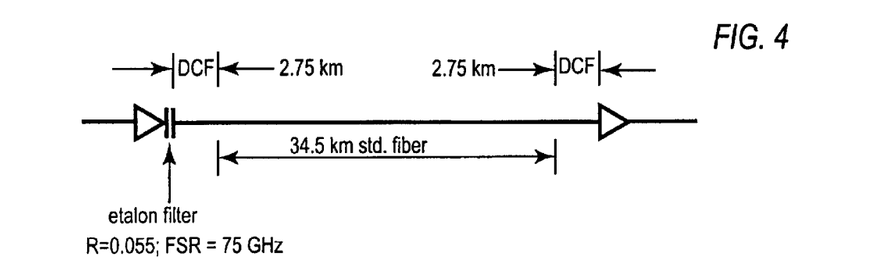
FIG. 4 shows a D map period for a dispersion managed soliton transmission line of the first embodiment of the invention.

FIG. 4 shows a first embodiment of the present invention. The figure shows a D map period of a dispersion managed transmission line for use in propagating solitons. In the specific example shown, the D map period contains three segments of fiber—two segments of dispersion compensating fiber, or "DCF", of 2.75 km length sandwiching one 34.5 km segment of standard fiber. The specific properties of each type of fiber is listed in Table 1. The number of fiber segments, the types of fiber used, and the lengths of these segments are not a limitation on the invention, however, and need not be the same as those shown in the figure. The only limitation in this regard is that the number of fiber segments, the type of fiber, and the lengths of the segments must be chosen in accordance with the principles of dispersion management. In other words, the number of fiber segments, the type of fiber, and the lengths of the segments must be chosen such that $|D_{loc}|$ at any point along the D map is high, i.e., not less than 3 ps/(nm-km), and $\overline{D}$ is at or near zero, i.e., not greater than 0.5 ps/(nm-km).

Unlike the prior art, the D map period here has the same length as the amplifier period. In the prior art, making the amplifier period the same length as the D map period caused the pulse breathing in the +D section of the D map to become highly asymmetric which in turn caused excessive pulse interaction. The present embodiment of the invention restores pulse breathing symmetry by the addition of a guiding filter preceding the D map period.

The guiding filter, which is essentially a narrow bandpass filter, reduces the bandwidth of the soliton pulses passing through it by at least 1%. Since a guiding filter precedes each periodic section of the transmission line, absent some compensation, the cumulative effect of all the guiding filters would be to continuously reduce the bandwidth and increase the pulse width of solitons traveling down the transmission line.

The bandwidth reduction of the guiding filter is compensated for by increasing the pulse energy of the soliton pulses at each optical amplifier. The increased pulse energy creates a greater SPM bandwidth increasing effect which counterbalances the bandwidth reduction of the guiding filter.

The bandwidth reduction of the guiding filter and corresponding increased pulse power needed to compensate has several effects. One effect is to restore the pulse breathing symmetry in the +D section of the D map.

Figure 5:
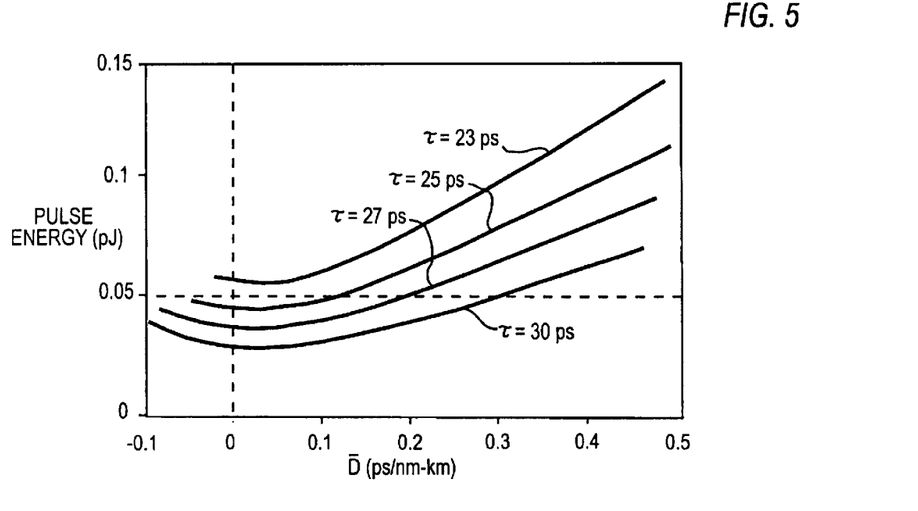
FIG. 5 shows a graph of the path average pulse energy vs. $\overline{D}$ for solitons propagating through the D map of FIG. 4.

Another more significant effect is to cause the path average pulse energy vs $\overline{D}$ behavior shown in FIG. 5. This data used for the graph in FIG. 6 was obtained through computer simulation. Using the basic D map of FIG. 4, the fiber segment D values and lengths were slightly altered many times in order to vary $\overline{D}$ over the range shown in FIG. 5. Then for each $\overline{D}$ value, the simulation injected solitons of the pulse widths, or "τ", shown into the D map and measured the resulting path average pulse energy.

FIG. 5 shows that a transmission line having the D map of FIG. 4 can transmit soliton pulses of much larger pulse width (and much smaller bandwidth) with much larger path average pulse energies at or near $\overline{D}=0$ as compared to a transmission line having the prior art D map. Thus, compared to the prior art, the transmission line of the present embodiment can transmit solitons at or near $\overline{D}=0$, where timing jitter is greatly reduced, with greater spectral efficiency, since the smaller bandwidths can be used, and with enough path average pulse energy to achieve a signal-to-noise ratio allowing for error-free transmission at transoceanic distances.

In addition, FIG. 5 shows that the path average pulse energy is nearly independent of $\overline{D}$ at or near $\overline{D}=0$ for the several soliton pulse widths shown. Thus, unlike the prior art, solitons in this transmission line continue to have adequate path average pulse energies to achieve error-free transmission at transoceanic distances even where $\overline{D}$ varies somewhat from zero and where the soliton pulse widths vary. Thus, a transmission line having a D map of the present invention has a much greater tolerance for parameter variation than does the transmission line of the prior art.

In the specific example shown in FIG. 4, the guiding filter used is a Fabry-Perot etalon with a free spectral range, or "FSR", of 75 GHz and a mirror intensity reflectivity, or "MIR", of 0.055. However, using such a filter is not a limitation of the invention.

For a single frequency channel transmission system, the guiding filter may be any narrow bandpass filter having a strength such that pulses passing through the filter have their bandwidths reduced by at least 1%. The strength of a filter is the intensity of the effect the filter has on pulses passing through it. This intensity is determined by the curvature of the filter response at the peak of the filter response which can be represented by a parabola.

Figure 6:
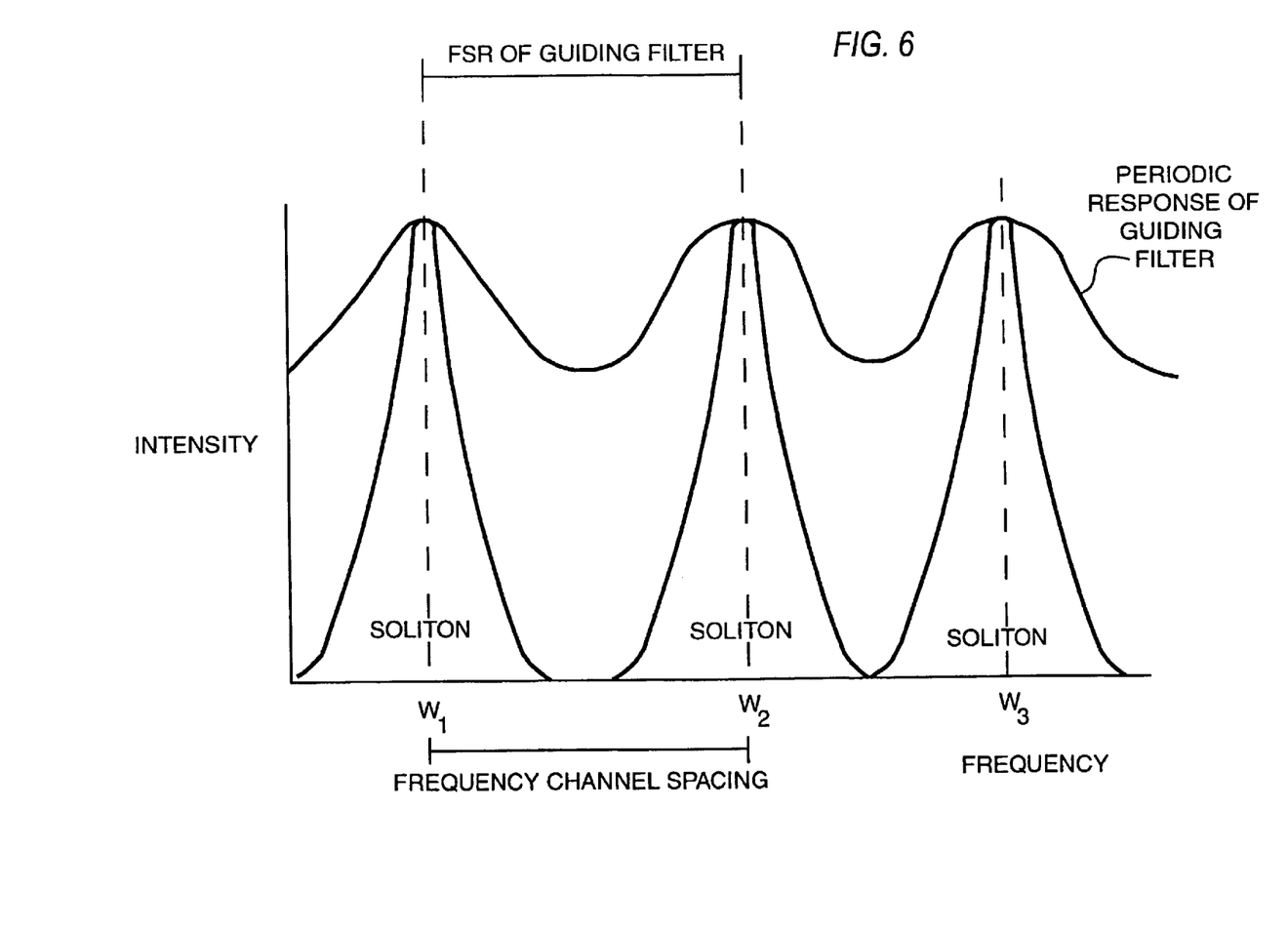
FIG. 6 shows the periodic filter response of a guiding filter used for WVDM.

For a WDM system, the FSR of the guiding filter must also be specified in addition to the filter strength. As shown in FIG. 6, the FSR, or the periodicity, of the guiding filter should be chosen to equal to the desired channel spacing for WDM.

Figure 7:
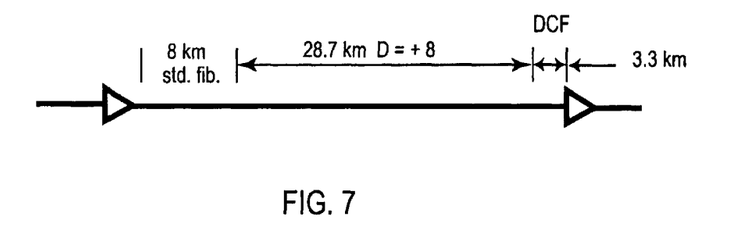
FIG. 7 shows a D map period for a dispersion managed soliton transmission line of the second embodiment of the invention.

Another embodiment of the present invention is shown in FIG. 7. As in the previous embodiment, the D map period length here is the same as the amplifier period. In this embodiment, the pulse breathing symmetry in the +D section is restored by using two different types of +D fiber in the +D section.

As stated previously, because of loss in the fiber, solitons have a greater intensity at the beginning of the +D section than at the end of the +D section. This in turn results in a greater SPM and greater pulse width reducing effect at the beginning of the +D section than at the end of the +D section. The end result is asymmetric pulse breathing.

Figure 8:
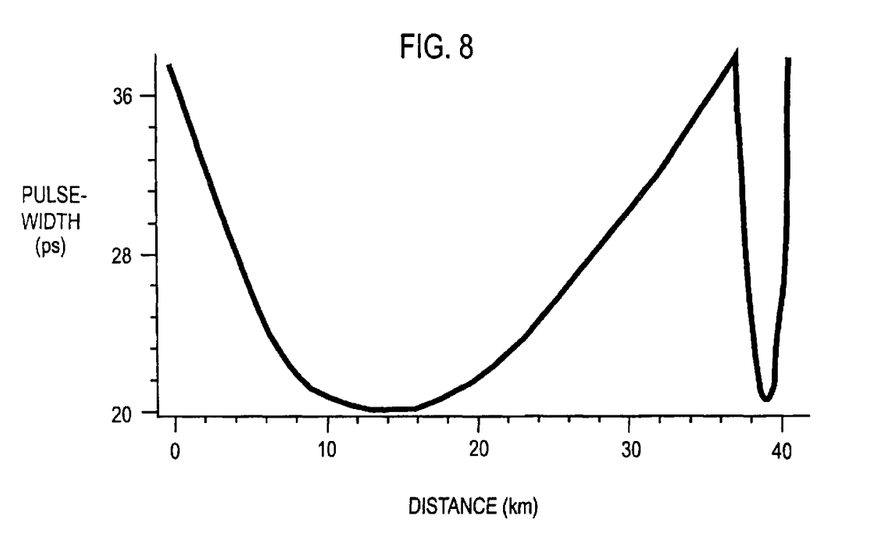
FIG. 8 shows a plot of the pulse width vs. distance for a soliton propagating through the D map of FIG. 7.

This intensity and SPM variation can be balanced using two segments of different types of +D fiber in the +D section where the dispersion and cross-sectional area, or "$A_{eff}$", are larger in the first +D segment than in the second +D segment. The increased dispersion in the first +D segment creates more pulse width broadening to counter the stronger SPM effect in the beginning of the +D section. At the same time, the increased $A_{eff}$ in the first +D segment reduces the effective pulse intensity which reduces the effect of SPM. In the second +D segment, lower dispersion results in less pulse width broadening to match the smaller SPM effect caused by the decreasing intensity. At the same time, the decreased $A_{eff}$ increases the effective pulse intensity which increases the effect of SPM at the back of the +D section. With these guidelines in mind, the type of fiber and length of fiber used for each +D segment can be chosen such that the pulse width broadening effects of dispersion and the pulse width reducing effects of SPM can be balanced between the two halves of the +D section. This results in nearly symmetrical pulse breathing between the two halves of the +D section as shown in FIG. 8.

In the example shown in FIG. 7, the D map consists of one long +D section, having an 8 km segment of standard fiber and a 28.7 km segment of low slope dispersion shifted fiber, and one short −D section of 3.3 km of DCF. Again, Table 1 lists the specific attributes of the different types of fiber. However, these specific types of fiber and lengths of fiber need not necessarily be used. The types of fiber and the lengths of the fiber segments used in the D map must be chosen in accordance with the principles of dispersion management, i.e., such that $|D_{loc}|$ at any point along the D map is high, i.e., not less than 3 ps/(nm-km), and $\overline{D}$ is at or near zero, i.e., not greater than 0.5 ps/(nm-km). In addition, the types of fiber and lengths of the fiber segments used in the +D section of the D map must be chosen such that the pulse width broadening effects of dispersion and the pulse width reducing effects of SPM are nearly balanced between the two halves of the +D section.

The present invention can also be used for transmission lines where the amplifier period is much greater than 40 km. Within the continental United States, the spacing between amplifiers is generally 80 km and can be as much as 120 km. For systems employing dense WDM, the total signal power required at the beginning of the amplifier period would be 1 W for a period of 80 km and 10 W for a period of 120 km. Such high power levels require amplifiers which are complex and expensive and also pose the constant threat of optical damage. Of even greater importance, such high power levels greatly increase error producing non-linear effects, such as cross-phase modulation and four-wave mixing.

Figure 9A:
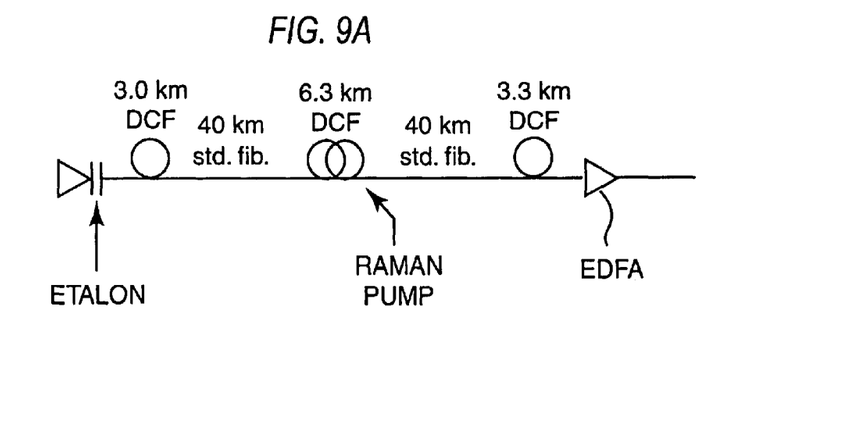
FIGS. 9a and 9b show D map periods for dispersion managed soliton transmission lines of the third embodiment of the invention.
Figure 9B:
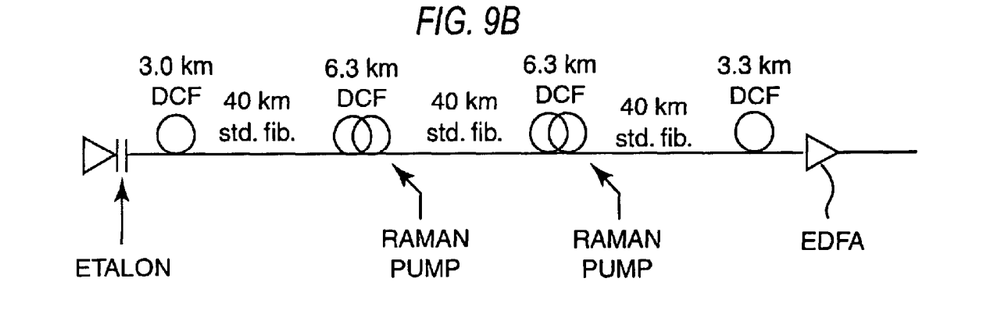

The D map of the first embodiment of the invention can be modified to accommodate these existing 40 km spans and large amplifier periods and can do so with much lower power levels at the beginning of the amplifier period. FIGS. 9a and 9b show a third embodiment of the invention which consists of the D map of the first embodiment modified to accommodate larger amplifier periods of 80 km (FIG. 9a) and 120 km (FIG. 9b). Although the discussion of this third embodiment will focus on the 80 km example of FIG. 9a, it should be apparent to one of skill in the art that the 120 km D map of FIG. 9b operates similarly in all respects to the D map of FIG. 9a.

FIG. 9a shows a D map period of a transmission line of the third embodiment of the invention. As in the first embodiment, the D map of FIG. 9a shows a guiding filter preceding the D map. This guiding filter is similar to the filter used in the first embodiment.

At either end of the D map period, before the first 40 km span of standard fiber and after the second span of standard fiber, are short sections of −D fiber. In the specific example shown, the first −D section is 3.0 km long and the last −D section is 3.3 km long and the −D fiber used is DCF having the properties listed in Table 1. Separating the two 40 spans of standard fiber is an intermediate section of −D fiber. In the example shown, this intermediate −D section is 6.3 km long and again DCF can used. It should be noted that these −D fiber sections can be easily spliced into an existing line of standard fiber because hand holes, i.e., concrete boxes roughly 1 m³ in size which provide for the splicing together of fiber, are located every several kilometers along a line of standard fiber.

As stated previously, the problem with such long amplifier spacings is that if standard power levels are used at the amplifiers the optical signal is too weak at the end of the period, and if power is increased so that the signal remains strong at the end of the period, the amplifiers become complex and expensive and the increased power constantly threatens to cause optical damage and greatly increases error producing non-linear effects. The third embodiment of the invention solves this problem by providing a secondary amplification of the signal within the D map period through Raman amplification.

In Raman amplification, light of a higher frequency than the frequency of the signal pulses is injected into the optical fiber carrying the signal pulses. The higher frequency light here is known as the pump light. As the signal pulses pass through the area of fiber excited by the pump light, they extract energy from the pump light through what is known as the Raman effect. Thus, the signal pulses are amplified.

As shown in FIG. 9a, a Raman pump is attached to the intermediate section of −D fiber. The Raman pump here consists of a small group of diode lasers which inject light of higher frequency than the signal pulses into the intermediate section of −D fiber. In the example shown, the diode lasers inject beams of light in the 1420 to 1480 nm wavelength range into the intermediate −D fiber section. However, as is known, any wavelength of light that is about 3 to 13 THz higher in frequency than the signal pulses can be used to provide significant amounts of Raman gain, the exact amount depending on the frequency difference between the pump light and the signal pulses.

The electrical power required by the diode lasers can be supplied through a variety of means. For example, electricity from the amplifier huts can be carried to the diode lasers through the steel sheaths of the fiber cables. Alternatively, a battery, periodically recharged by a local solar cell, could be used.

Figure 10:
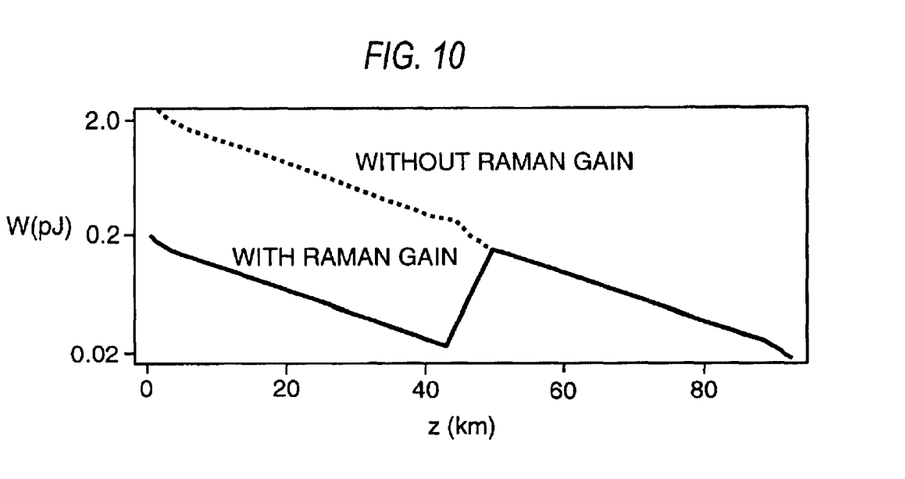
Figure 11:
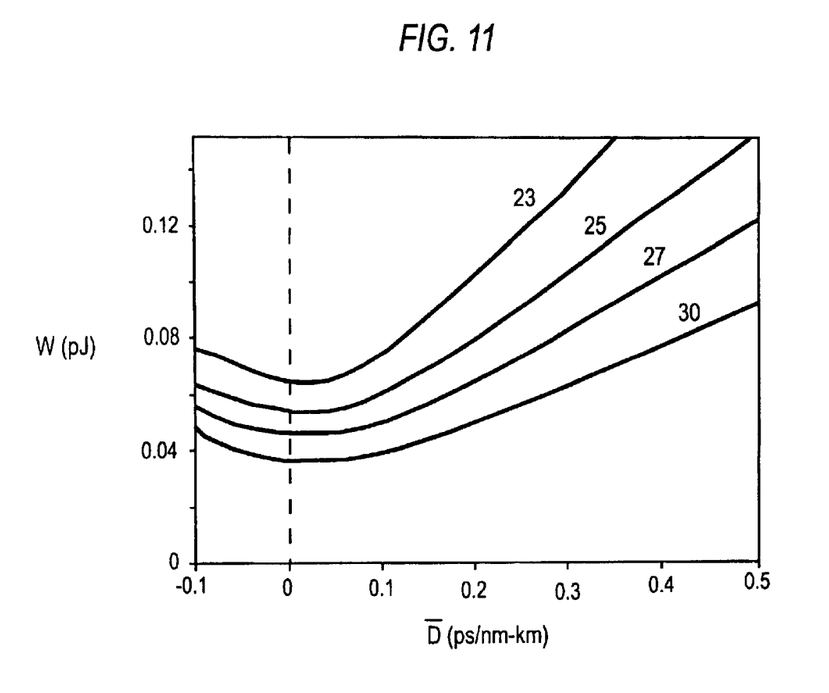

The effect of this Raman amplification is shown in FIG. 10 which describes the signal power versus distance for a transmission line having the D map of the third embodiment. As the figure shows, the power required at the amplifier (the beginning of the period) to maintain adequate signal strength at the end of the period is much lower where the intermediate amplification is employed. With Raman amplification, the path average pulse energy behavior vs. $\overline{D}$ for the D map of FIGS. 9a and 9b, shown in FIG. 11, is similar in all respects to the path average pulse energy behavior vs. $\overline{D}$ for the D map of FIG. 4.

The foregoing merely illustrates the principles of the present invention. Those skilled in the art will be able to devise various modifications, which although not explicitly described or shown herein, embody the principles of the invention and are thus within its spirit and scope.

What is claimed is:

1. A lightwave transmission system for propagating solitons comprising:
    an optical fiber transmission line having at least two sequences,
    each of said sequences having a length z and comprising at least one segment of optical fiber having a corresponding positive time delay dispersion constant, said constant being defined herein as "D", and at least one segment of optical fiber having a corresponding negative D,
        wherein the absolute value of D of each of said segments is not less than 3 ps/(nm-km), and
        wherein the path average dispersion of each of said sequences is not greater than 0.5 ps/(nm-km);
    one optical amplifier for each of said sequences, said amplifiers spaced along said transmission line by a distance z; and
    one guiding filter preceding each of said sequences,
    wherein each of said guiding filters has a strength such that the pulse bandwidth of each of said solitons passing through each of said guiding filters is reduced by at least 1%.

2. The lightwave transmission system of claim 1, wherein each of said guiding filters has a free spectral range equal to a desired channel spacing.

3. The lightwave transmission system of claim 2, wherein each of said guiding filters is a Fabry-Perot etalon filter.

4. The lightwave transmission system of claim 1, further comprising
    at least one light source associated with at least one of said segments of each of said sequences, wherein said light sources inject light beams into each of said associated segments, said light beams having a higher frequency than said solitons, such that said solitons gain energy through the Raman effect.

5. The lightwave transmission system of claim 1, wherein each of said segments having a positive D has the characteristics of $$D \text{ at } 1550 \text{ nm } [\text{ps}/(\text{nm-km})] = +16.7, \partial D/\partial\lambda[\text{ps}/(\text{nm}^2\text{-km})] = +0.056, A_{\text{eff}}(\mu m^2) = 80, \text{ and}$$

wherein each of said segments of optical fiber having a negative D has the characteristics of $$-130 \leq D \text{ at } 1550 \text{ nm } [\text{ps}/(\text{nm-km})] \leq -80, -0.37 \leq \partial D/\partial\lambda[\text{ps}/(\text{nm}^2\text{-km})] \leq -0.30, \text{ and } A_{\text{eff}}(\mu m^2) = 19.$$

6. A lightwave transmission system for propagating solitons comprising:
    an optical fiber transmission line having at least two sequences,
    each of said sequences having a length z and comprising at least one segment of optical fiber having a corresponding positive time delay dispersion constant, said constant being defined herein as "D", and at least one segment of optical fiber having a corresponding negative D,

TABLE 1

Properties of Some Commercial Fibers

| Type of Fiber | D at 1550 nm [ps/(nm-km)] | $\partial D/\partial\lambda$ [ps/(nm²-km)] | $A_{\text{eff}}$ (μm²) | PMD (ps/(km)^{1/2}) | Loss Rate (dB/km) |
|---|---|---|---|---|---|
| Standard | +16.7 | +0.056 | 80 | 0.25 | 0.20 |
| Low slope dispersion shifted | +8 | +0.025to+0.04 | 48 | 0.05 | 0.21 |
| New dispersion-shifted | −104 | −0.35 | 19 | 0.15 | 0.5 | wherein the absolute value of D of each of said segments is not less than 3 ps/(nm-km), and wherein the path average dispersion of each of said sequences is not greater than 0.5 ps/(nm-km);

one optical amplifier for each of said sequences, said amplifiers spaced along said transmission line by a distance z, and wherein each of said segments having a positive D comprises a first section of optical fiber having a first positive D and a first cross-sectional area, said area being defined herein as "$A_{eff}$", and a second section of optical fiber having a second positive D and a second $A_{eff}$, and wherein said first positive D is greater than said second positive D and said first $A_{eff}$ is greater than said second $A_{eff}$.

7. The lightwave transmission system of claim 6, wherein said first section of optical fiber having a first positive D has the characteristics of $$D \text{ at } 1550 \text{ nm } [ps/(nm\text{-}km)] = +16.7, \partial D/\partial \lambda [ps/(nm^2\text{-}km)] = +0.056, A_{eff}(\mu m^2) = 80, \text{ and}$$

wherein said second section of optical fiber having a second positive D has the characteristics of $$+3 \leq D \text{ at } 1550 \text{ nm } [ps/(nm\text{-}km)] \leq +10, +0.025 \leq \partial D/\partial \lambda [ps/(nm^2\text{-}km)] \leq +0.04, 45 \leq A_{eff}(\mu m^2) \leq 55, \text{ and}$$

wherein each of said segments of optical fiber having a negative D has the characteristics of $$-130 \leq D \text{ at } 1550 \text{ nm } [ps/(nm\text{-}km)] \leq -80, -0.37 \leq \partial D/\partial \lambda [ps/(nm^2 km)] \leq -0.30, \text{ and } A_{eff}(\mu m^2) = 19.$$

8. A lightwave transmission system for propagating solitons comprising:

an optical fiber transmission line having at least two sequences, each of said sequences having a length z and comprising at least one segment of optical fiber having a corresponding positive time delay dispersion constant, said constant being defined herein as "D", and at least one segment of optical fiber having a corresponding negative D, wherein the absolute value of D of each of said segments is not less than 3 ps/(nm-km), and wherein the path average dispersion of each of said sequences is not greater than 0.5 ps/(nm-km);

one optical amplifier for each of said sequences, said amplifiers spaced along said transmission line by a distance z;

one guiding filter preceding each of said sequences, wherein each of said guiding filters has a strength such that the pulse bandwidth of each of said solitons passing through each of said guiding filters is reduced by at least 1%; and wherein each of said segments having a positive D comprises a first section of optical fiber having a first positive D and a first cross-sectional area, said area being defined herein as "$A_{eff}$", and a second section of optical fiber having a second positive D and a second $A_{eff}$, and wherein said first positive D is greater than said second positive D and said first $A_{eff}$ is greater than said second $A_{eff}$.

* * * * *